United States Patent [19]

Dray

[11] 3,906,798

[45] Sept. 23, 1975

[54] INSTRUMENT PROTECTING MEANS

[75] Inventor: Walter L. Dray, Davenport, Iowa

[73] Assignee: The Bendix Corporation, South Bend, Ind.

[22] Filed: Sept. 30, 1974

[21] Appl. No.: 510,838

[52] U.S. Cl. .................... 73/384; 55/274; 55/302; 55/316; 55/318; 55/385; 55/389; 55/419; 55/485; 55/512; 55/DIG. 17; 340/27 AT
[51] Int. Cl.² ......................................... G01L 7/20
[58] Field of Search ............ 55/179, 181, 274, 282, 55/302, 316, 318, 385, 389, 414, 419, 466, 483, 485, 512, DIG. 16, DIG. 17, DIG. 34; 73/384, 386, 387; 340/27 AT

[56] References Cited
UNITED STATES PATENTS

| 672,531 | 4/1901 | Hunter | 55/316 X |
| 1,839,350 | 1/1932 | Slagel | 55/316 |
| 2,216,763 | 10/1940 | Boyce | 55/483 X |
| 3,152,476 | 10/1964 | Criner | 55/274 X |
| 3,197,945 | 8/1965 | Zadhiropoulos | 55/389 X |

Primary Examiner—Frank W. Lutter
Assistant Examiner—David L. Lacey
Attorney, Agent, or Firm—Leo H. McCormick, Jr.; William N. Antonis

[57] ABSTRACT

A protector means for substantially preventing moisture and oxygen present in a source of air from entering into a sealed housing and affecting the operation of an instrument located in the housing which is responsive to altitude changes of the housing.

8 Claims, 1 Drawing Figure

US Patent  Sept. 23,1975  3,906,798
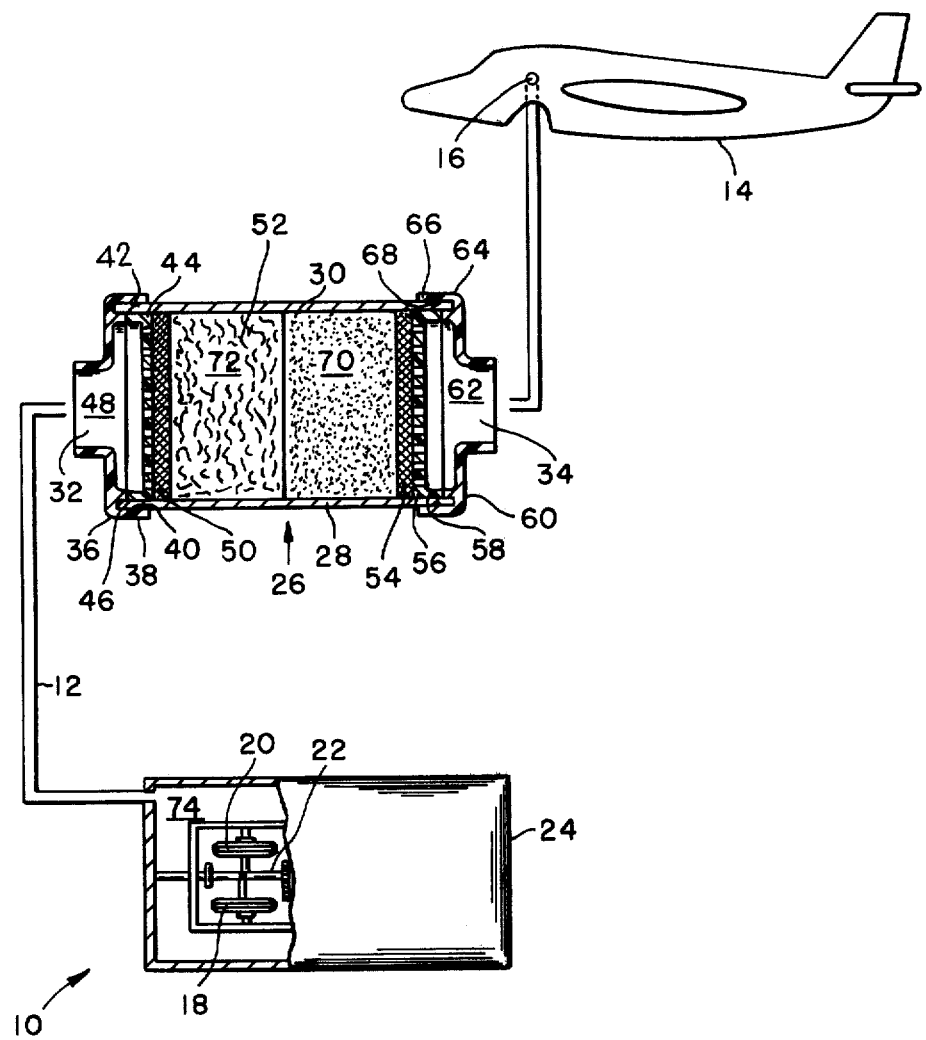

INSTRUMENT PROTECTING MEANS

BACKGROUND OF THE INVENTION

Aircraft instruments such as altimeters, airspeed indicators, rate of climb, etc. which respond to air from a static or pitot line for providing information to operate the instrument and present a pilot with an indication of the operational parameters of the aircraft, often times become inoperative due to moisture affecting the reading of the instrument. This moisture is caused by moist air being drawn into the instrument and condensing on the walls of the instrument during descent of the aircraft from a higher altitude. This condensation occurs most often in aircraft wherein evasive action of the pilot requires rapid changes in altitude. If there is no means for this moisture to escape, such as a drain plug, the moisture buildup and oxidation in the instrument will eventually cause a malfunction to occur in the instrument.

SUMMARY OF THE INVENTION

I have devised a protector means for preventing moisture present in air from entering into and affecting the operation of an instrument in a sealed housing. The protector means includes a filter which contains a molecular sieving material. The molecular sieving material which has an affinity for water vapor and oxygen is placed in the pitot or static line to present a dry nitrogen enriched effluent to the instrument as an indication of the atmospheric conditions from which the aircraft operational parameters are derived. The dry nitrogen effluent will enter the sealed housing of the instrument during a descent in elevation and with an ascent will pass out of the sealed housing. The nitrogen effluent passing through the molecular sieve will desorb the water vapor and oxygen therein and return to the atmosphere as air completely regenerating the molecular sieve to allow repeated cycling with substantially the same quality of filtering.

It is therefore the object of this invention to provide an aircraft instrument with protector means to prevent the entry of moisture into a sealed housing.

It is another object of this invention to provide an in-line filter which removes oxygen and water vapor in the atmospheric communication line to an instrument in response to changes in altitude to prevent water vapor and oxidation from affecting the operation of the instrument.

It is a further object of this invention to provide a protector means for preventing moisture and oxygen present in air from entering a sealed instrument chamber and affecting the reading of the instrument.

These and other objects of this invention will become apparent from reading this specification and viewing the drawing.

BRIEF DESCRIPTION OF THE DRAWING

The drawing schematically illustrates an in-line protector means presenting an instrument with information from the atmosphere from which operational parameter of the aircraft is obtainable.

DETAILED DESCRIPTION OF THE EMBODIMENT

In the drawing a sealed instrument means 10, such as the bellows of an altimeter being shown, is connected by a supply conduit or static line 12 to the atmosphere by a hole 16 in the side of the aircraft 14. The operational signal corresponding to the altitude of the aircraft 14 is directly transmitted to the instrument. Bellows 18 and 20 located in the sealed instrument means 10 will react to the atmosphere to move shaft 22 and provide a readout on face 24 to inform the pilot of the altitude of the aircraft. A filter means 26 is located in the supply conduit for preconditioning the operational signal from the atmosphere to provide assurance that the readout is not adversely affected by contamination of the component parts of the instrument means 10 by water vapor or oxidation.

The filter means 26 consists of a housing 28 having a cavity or chamber 30 therein with a first port 32 connected to the sealed instrument 10 and a second port 34 connected to the atmosphere. A first cap 36 has an annular surface 38 with a rib 40 which snaps into a groove 42 on the housing 28 to enclose one end of the filter means 26. A first spacer 44 has a series of projections 46 which engage the first cap to form a first distribution chamber 48 within the filter means 26. A first screen 50 is located adjacent the first spacer 44 for preventing any of the filtering material 52 from escaping into the first chamber where it could be carried to the instrument means 10. The filtering material substantially fills the chamber 30 preventing any flow path for the operational signal from the first port 34 to the second port 32 which could circumvent the preconditioning effect of the filtering material.

A second screen 54 is located adjacent the filtering material to prevent any of the filtering material from escaping into the atmosphere through the second port 34. A second spacer 56 has a series of projections 58 which engage the second cap 60 to hold the second screen away from the second port 34 and form a second distribution chamber 62 within the filtering means 26. The second cap 60 has an annular surface 64 with a rib 66 thereon which snaps into a groove 68 on the housing 28.

The filtering material within chamber 30 will normally be a molecular sieve material having a pore size in the range of 4–5 Angstrom units. The molecular sieve material most readily available is zeolite, either natural or synthetic, which will adsorb oxygen and to some extent water vapor on its surface. Under some conditions it may be necessary to have a first section 70 which contains a zeolite and a second section 72 which contains silica gel particles, the silica gel being introduced to absorb water vapor which may be present in the operational signal after it passes through the zeolite. Thus it is possible to tailor the operational signal which is communicated through the first port to a single component of air, such as dry nitrogen enriched effluent. Thus the particle pore size selected for the molecular sieve can be chosen to adsorb components from the air which may detrimentally affect the operation of said sealed instrument.

MODE OF OPERATION OF THE PREFERRED EMBODIMENT

When an aircraft is at ground level, air at atmospheric pressure is communicated through the pitot line or supply conduit 12 to the interior 74 of the sealed instrument 10. Upon an aircraft taking off from an airport and ascending into the atmosphere, the pressure of the ambient air will be less than that of the air in chamber 74 causing a pressure differential to occur. The air in chamber 74 will flow through the supply conduit 12 until the pressure in chamber 74 is equal to ambient, the bellows 18 and 20 responding to the change in air pressure associated with altitude to provide the pilot with an indication of the elevation of the aircraft above sea level.

Conversely upon descent, the ambient air pressure will be greater than that in chamber 74 causing air to flow in the supply conduit 12. When this air flows in the supply conduit 12 it must pass through the filter means 26 before reaching the sealed chamber 74 in the instrument 10. When air passes through the port 34 upon descent a uniform distribution will occur in the second chamber 62 to provide a multitude of flow paths through which air may be communicated to the filter material in chamber 30. In the second section 70, oxygen is adsorbed in the zeolite or other molecular sieve material to produce a nitrogen enriched effluent which will be communicated to the first section. In the first section 72, silica gel will remove any water vapor in the nitrogen enriched effluent. This dry nitrogen enriched effluent will provide an operational signal to actuate the bellows 18 and 20. During ascent, the dry nitrogen enriched effluent will flow back through the silica gel to pick up the moisture contained therein and through the zeolite to desorb oxygen therefrom and be returned to the atmosphere as air.

Thus by placing the filtering means 26 in line with the atmospheric control signal, the oxygen will be removed to prevent oxidation deterioration of the components in the sealed instrument and the water vapor will be removed to avoid a water buildup which can occur with rapid changes in temperature experienced during corresponding changes in altitude.

I claim:

1. A protector means for preventing moisture present in the air from entering a sealed housing and affecting the operation of an instrument located in the housing and which is responsive to altitude changes of the sealed housing, said protector means comprising:
   a container having a chamber therein, said chamber having a first port and a second port;
   first conduit means connecting the first port with the sealed housing;
   second conduit means connecting the second port with the atmosphere; and
   filter means substantially filling said chamber for adsorbing oxygen and water vapor from said air when there is a decrease in the altitude of said housing whereby dry nitrogen enriched effluent flows into the sealed housing, and said dry nitrogen enriched effluent flows from the housing through the first conduit means into the chamber thereby purging the filter means of oxygen and water vapor when there is an increase in altitude of said housing to regenerate the filter.

2. In the protector means, as recited in claim 1, wherein said filter means includes:
   first spacer means located adjacent said first port for uniformly distributing the flow of the dry nitrogen effluent from the sealed housing throughout the chamber during ascent of the sealed housing.

3. In the protector means, as recited in claim 2, wherein said filter means further includes:
   second spacer means located adjacent said second port for uniformly distributing the flow of said air from the atmosphere throughout the chamber during descent of the sealed housing.

4. In the protector means, as recited in claim 3, wherein said filter means includes:
   a molecular sieving material located in said chamber between the first spacer means and the second spacer means, said molecular sieving material having a pore size in the range of 4–5 Angstrom units.

5. In the protector means, as recited in claim 4, wherein said filter means includes:
   first screen means located adjacent the first spacer means for preventing any of the molecular sieving material from escaping from the chamber into the sealed housing.

6. In the protector means, as recited in claim 5, wherein said filter means includes:
   second screen means located adjacent to the second spacer means for preventing any of the molecular sieving material from escaping from the chamber into the atmosphere.

7. In the protector means, as recited in claim 6, wherein said filter means includes:
   a first section adjacent said first screen means and containing a silica gel material for the removal of water vapor from the air; and
   a second section adjacent said second screen means and containing a zeolite material for the removal of oxygen from the air.

8. In the protector means, as recited in claim 3, wherein said filter means includes:
   a molecular sieve material located in said chamber between the first spacer means and the second spacer means, said molecular sieve material having a predetermined pore size to selectively adsorb components from the air which may detrimentally affect the operation of said sealed instrument.

* * * * *